Jan. 7, 1947.  D. W. COOPER  2,414,023
RELEASE LINK
Filed Feb. 10, 1945  4 Sheets-Sheet 1
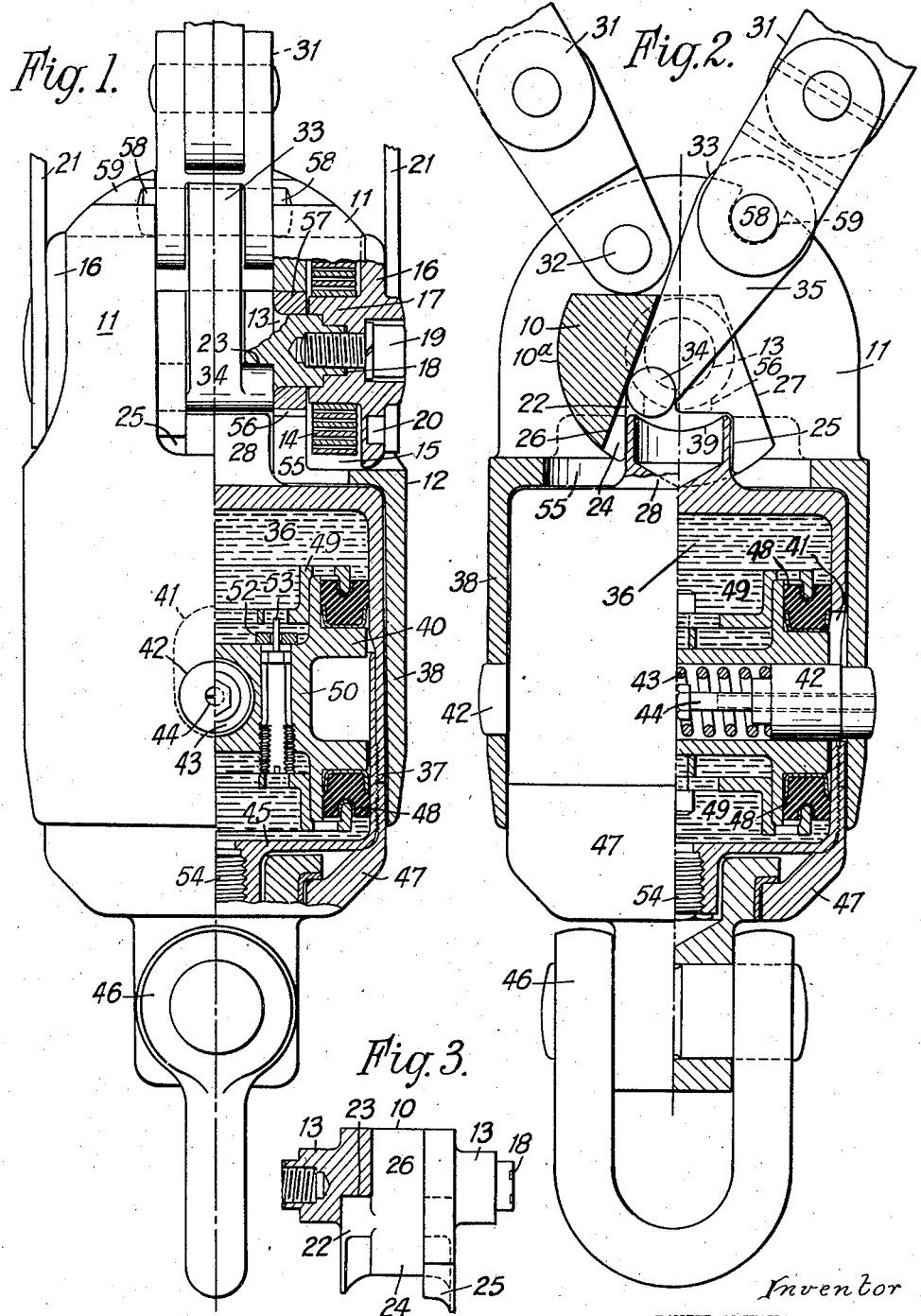
Inventor
DANIEL WALMSLEY COOPER
By
Attorney

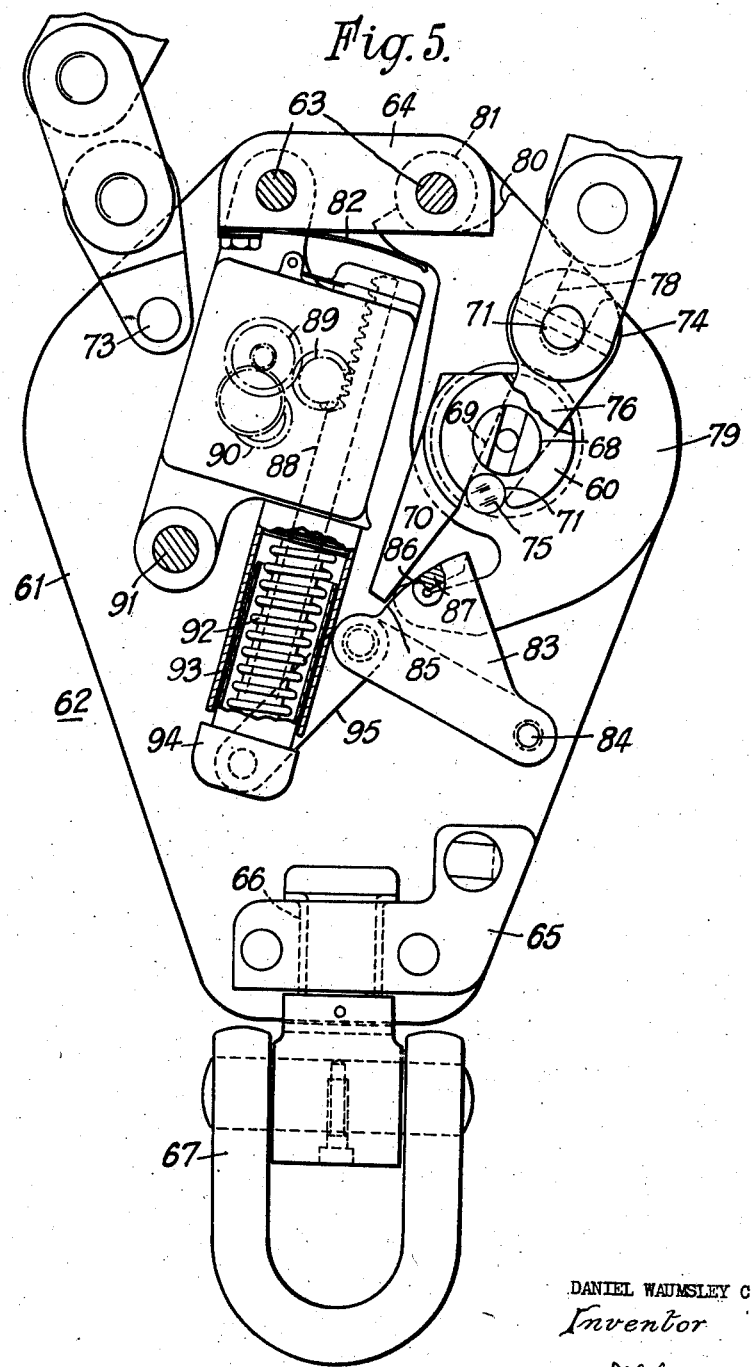

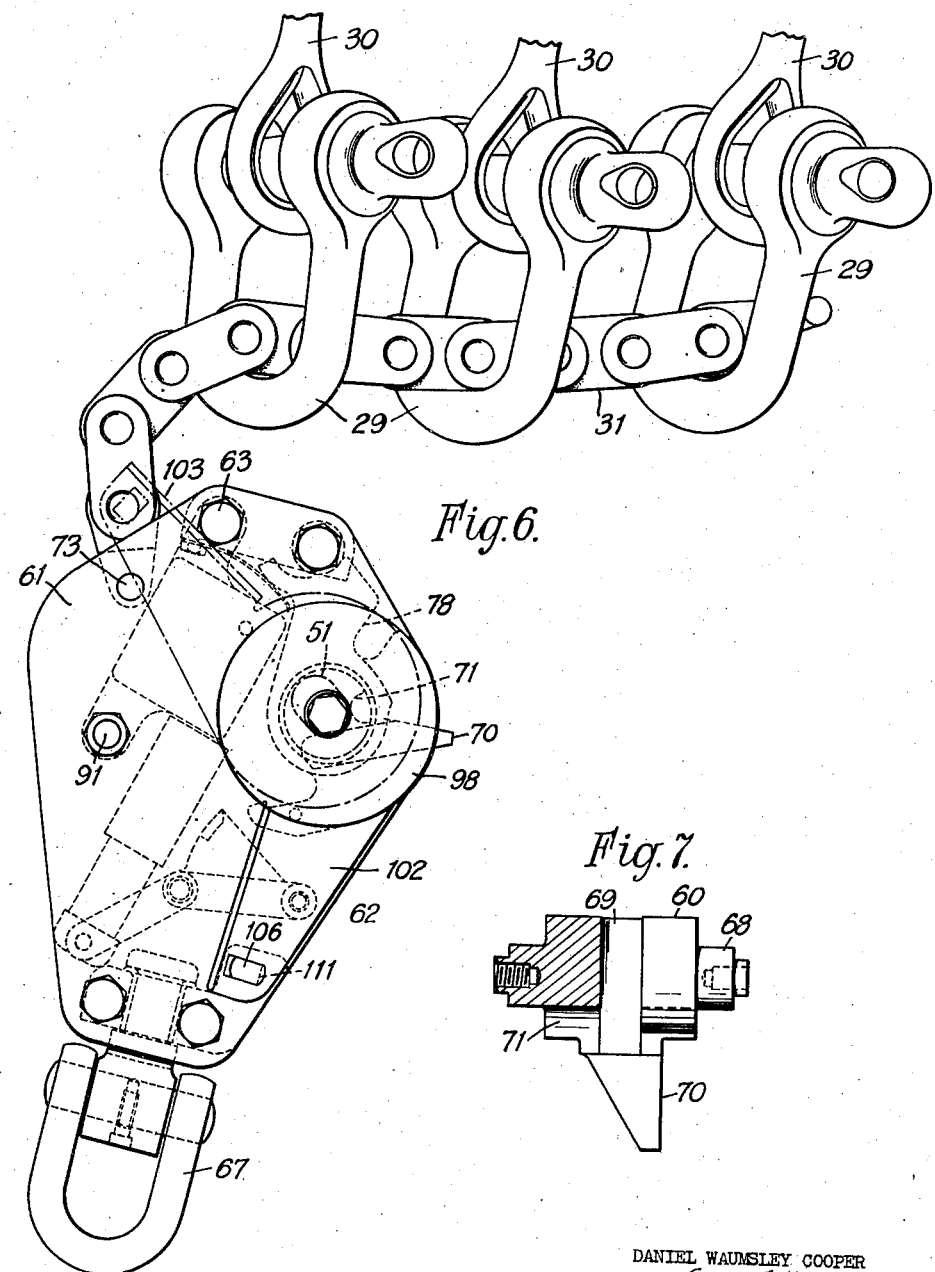

Patented Jan. 7, 1947

2,414,023

UNITED STATES PATENT OFFICE 2,414,023

RELEASE LINK

Daniel Waumsley Cooper, Waltham Chase, England,

Application February 10, 1945, Serial No. 577,308
In Great Britain January 26, 1944

12 Claims. (Cl. 294—83)

This invention relates to release-links or attachments for the automatic release of parachute-borne loads upon reaching the ground or other support when dropped from aircraft.

The invention has for its main object to provide an improved release-link of this character which operates automatically to disconnect the load from its parachute or parachutes when the said load reaches the ground or other support.

Another object of the invention is to provide an automatic release-link controlled by a timing device which prevents premature release of the load from the parachute or parachutes within a predetermined period after the dropping of the load from the aircraft.

A further object of the invention is to provide an improved release link of this character which is particularly applicable to the dropping of heavy military or other stores by the use of a plurality of parachutes, for example three to six or more parachutes of large dimensions, with orderly release of the several parachute rings or the like.

A still further object is to provide a delay-action release-link including a rotatable member for locking a shackle or the like in engagement with the link, the tension due to the load acting to hold the rotatable member in locking position against the action of spring means tending to unlock the rotatable member, and positive means for holding the rotatable member in locking position, said positive holding means being controlled by a timing device which prevents premature unlocking and release within a period sufficiently long to ensure that the pull on the link has settled down to a steady value after the deployment of the parachute or parachutes.

Other objects and advantages of the invention will hereinafter appear from the following description, given with reference to the accompanying drawings, in which—

Figs. 1 and 2 are part-sectional elevations, viewed in directions at right angles to one another, of a first form of construction of the release-link, including a hydraulic timing device.

Fig. 3 is a detail of the locking key or rotor.

Figs. 4 and 5 are part-sectional elevations, also viewed in directions at right angles to one another, of a second form of construction of the release-link, including a mechanical timing device.

Fig. 6 is an elevation, corresponding to Fig. 5, but on a smaller scale, showing a chain for coupling the release-link to a plurality of parachutes, the shackle or equivalent member having been released from the link.

Fig. 7 is a detail of the locking key or rotor shown in Figs. 4 and 5.

Figure 4:
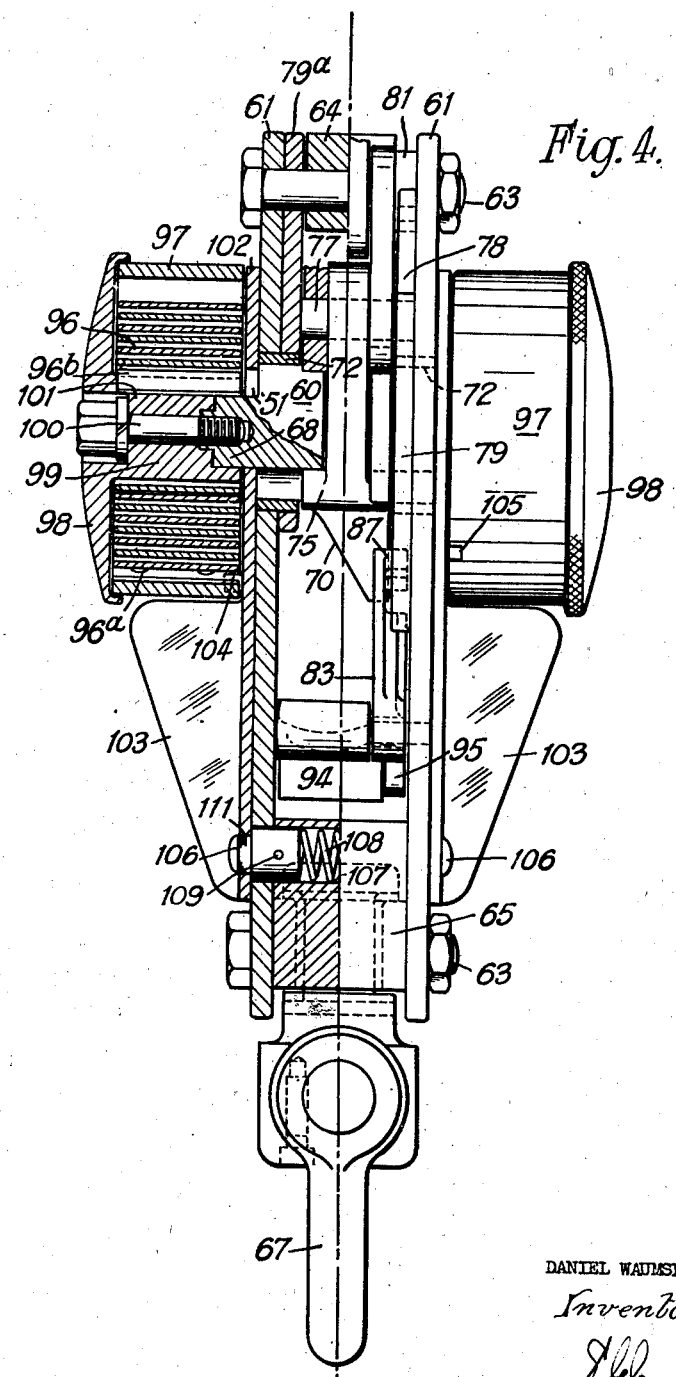

As illustrated in Figs. 1 to 3, the locking key consists of a member 10 rotatable between the arms 11 of a fork at the upper end of the link 12, with its trunnions 13 journaled in the fork arms; the axis of rotation of said member 10 upon its trunnions intersects the longitudinal axis of the link, as seen in Fig. 2. A pair of clock springs 14 are housed in recesses 15 on the outer sides of the fork arms, and two cover-plates 16 over the springs are detachably secured to the extremities of the trunnions 13. The springs 14 are anchored to the outer walls of their housing recesses and their inner ends are connected to the trunnions 13 by way of hubs 17 upon the cover-plates, which are themselves secured to the trunnions by keying devices 18 and by screws 19 engaged axially in the trunnion extremities. The exposed faces of the cover-plates are formed with holes or notches 20 to receive corresponding pegs upon a cocking lever or handle 21 whereby the trunnions and locking key or rotor 10 can be turned in opposition to the springs 14.

The body of the rotatable locking key, as best seen in Fig. 3, is provided with a slot 22 extending from end to end parallel to the axis of the trunnions 13. The body may be formed for example from a substantially cylindrical blank, having its ends reduced to constitute the trunnions; the body of the blank is slotted longitudinally along or on one side of a generatrix, the bottom of the slot 22 including a portion 23 of semi-circular cross-section. The body is also slotted transversely at 24 so as to intersect the first slot 22 in the middle of its length and leave a pair of parallel claws 25 at opposite ends of the body; the bottom 26 of this transverse slot may be flat and tangential to the semi-circular bottom portion of the longitudinal slot, as seen in Fig. 2, and the claws 25 may project beyond the general circumference of the body for a purpose to be mentioned hereinafter. Excess material is preferably removed by cutting away the backs of the claws at 27 and by continuing the milling or other cut around the axis for a suitable angular extent, as shown in Fig. 2.

The longitudinal slot 22 in the key body is adapted to be engaged by a shackle or equivalent member, connected to the parachute or parachutes; both slots are adapted to be engaged at their intersection by a block 28 controlled by a timing device, the engagement of the block in the longitudinal slot holding the said shackle or equivalent member in the bottom of the slot and its engagement in the longitudinal slot preventing rotation of the key by the clock springs.

In one arrangement, the link is provided with a chain 31 such as shown in Fig. 6, adapted to pass through the rings, grommets or like connections 29 at the lower ends of the rigging lines 30 of two or more parachutes. One end of the chain is permanently attached to the release link, for example by a pin or rivet 32 extending between the fork arms 11 and with adequate clearance above the key body, or by a pair of eyes engaging external hubs on the cover-plates 16. The other end of the chain is fitted with a shackle 33 having a T-shaped head 34; the opposite extremities of this head are of a diameter equal to the bottom width of the longitudinal slot 22, the stem 35 being of a thickness slightly less than the width of the transverse slot 24. The shackle is likewise engaged with the adjacent link of the chain by a pin 58 protruding at each end, as seen in Fig. 1; these protruding ends fit into notches 59 upon the edges of the fork arms 11, so as to control the alignment of the shackle when locked by the key (see Fig. 2). After fitting the pin 58 into the notches 59, the shackle can be engaged with the key, when unlocked, by fitting its head-extremities in the manner of spigots into the bottom of the longitudinal slot 22 and swinging the stem 35 into the transverse slot so that the claws 25 overhang the spigots or extremities of the head 34. Upon operation of the cocking lever 21 to bring the longitudinal slot 22 of the key into the locking position, the claws will be turned down over the spigots until they lie parallel to the axis of the link, as seen in Fig. 2, the movement being limited by abutment of the claws against one side of the timing device block 28. In this position, the semi-circular bottom portion 23 of the longitudinal slot lies in such relation to the notches 59 and the axis of the trunnions that the oblique pull exerted through the shackle 33 at one end of the chain by the parachute connections 29, which keep the chain spread out in the form of a loop, passes on the opposite side of the axis to the claws; as can be seen from the position of the parts in Fig. 2, this pull tends to maintain the key in locking position, further rotation being prevented by the abutment of the claws 25 against the block 28.

The key or rotor 10 is also held in the locking position by positive engagement of the timing-device block 28 in the open end of the longitudinal slot 22; this timing device consists, in the example illustrated, of a hydraulic cylinder 36 having its two ends closed but detachably connected together by a screwed joint 37 at or below the middle of the length of the cylinder, which is slidable within a socket member 38 forming the body of the release link. The holding block 28 is provided on the exterior of the cylinder head, in the form of a central pillar adapted to register with the longitudinal slot 22 of the locking key, the top of the pillar being made concave as at 39 to allow passage of the key 10 when unlocked, and the concave face then engaging with the cylindrical surface 10a of the key to prevent return of the block 28 as the link hits the ground; the withdrawal of the block from the longitudinal slot enables it to clear the key as the latter is rotated by its clock-springs, so that the block is maintained down out of the way ready for re-cocking, when the claws 25 will abut against it to limit the movement to locked position, as described above.

A fixed piston 40 fitting inside the cylinder 36 is connected to the socket member by a gudgeon pin passing through openings 41 in the cylinder walls, these openings being elongated to allow for the cylinder travel. The gudgeon pin comprises two plugs or buttons 42 slidable radially in the piston and forced apart by a spring 43, so that they can be pressed inwards together in order to insert the cylinder in the socket member or to remove it therefrom; each plug or button 42 encloses a central screw 44, the outer end of which can be turned by a screwdriver or the like in order to lock the plugs in working position by bringing the inner ends of the two screws into abutment. The base 45 of the cylinder is connected to the load by another shackle or the like 46, which is preferably arranged to swivel so as to prevent the transmission of twist from the parachute lines 30 through the link 12 to the stores or other load, with possible damage to the chain 31 and eventually to the load on alighting; this swivelling shackle 46 may be connected to the cylinder base 45 by a ring nut or the like, as shown at 47.

The piston 40 is fitted with bucket leathers or the like packing means 48 on both faces, these being retained for example by flanged members 49 screwed into borings of the piston; between these members, the central web 50 of the piston, traversed by the gudgeon pin devices, carries a valve allowing free passage of liquid in one direction, corresponding to the forcing of the cylinder 36 into its socket 38 so as to engage the block 28 with the rotor, but restricting passage of liquid in the opposite direction, for example to a narrow annular space in the center of a valve disk 52 and around an adjustable guide rod 53, the valve lift being limited by the flanged member 49 at this end of the piston.

Liquid such as oil may be introduced into the hydraulic cylinder 36 by removing a filler-plug 54 in the base.

The locking key or rotor 10 is conveniently inserted into place before the hydraulic cylinder 36 is fitted within the socket 38, by passing it upwards through an aperture 55 in the head of the socket, the trunnions 13 being brought central within keyhole slots 56 on the inner faces of the fork arms 11; in this position of the parts, the bushes 57 are slipped over the trunnions to engage in the circular portions of the keyhole slots 56, thus holding the rotor 10 in place. The clock-springs 14 are next fitted into their recesses, the cover-plate hubs 17 engaged with the inner ends of these springs and pushed inwards to engage the locking means 18, and the screws 19 are finally inserted to secure the parts together.

In the embodiment illustrated in Figs. 4 to 7, the locking key or rotor consists of a member 60 rotatable between a pair of parallel cheek-plates 61 which form the body of the link 62, the plates being of inverted pear-shape in outline and secured together by bolts 63 with interposed distance pieces or spacers 64 and 65 at top and bottom; the bottom spacer 65 consists of a block having a swivel-eye 66 for the shank of a shackle 67 to which the load is attached, the shackle being thus free to rotate in relation to the link 62 so as to prevent the transmission of twist from the parachute to the load.

The rotor 60, as seen in in Fig. 7, is of cylindrical general shape, its ends having coaxial extensions 68 of smaller diameter and its central portion being slotted transversely at 69 to a depth of about three-quarters of its diameter; upon the unslotted side of this central portion, there is formed an extension arm 70 projecting in a tangential direction substantially parallel to the bottom of the slot 69, and the circumference of the cylindrical portion is notched to form two coaxial seatings 71 of approximately semi-circular cross-section adjacent to the inner end of the extension arm 70. The rotor 60 is mounted in the cheek-plates 61 by engaging its ends in two plain bushes 72 arranged coaxially in the plates;

the extension arm 70 fits between the inner ends of the bushes, while the end-extensions 68 of the rotor project outside the cheek plates.

The parachutes are connected to the top of the release-link by means of a pitch-chain adapted to pass through rings, shackles or the like at the lower ends of their rigging lines, as already described with reference to Fig. 4. One end of the chain is permanently attached to the release-link 62 by means of a pin 73 extending through the cheek-plates to one side of the top spacer 64. The other end of the chain is adapted to be connected to the release-link on the opposite side of the spacer 64 after this end of the chain has been threaded through the rings or the like of the rigging lines; the connection is locked by the key or rotor 60, which is mounted in the cheek-plates on this same side of the top spacer 64. The free end of the chain comprises a terminal link or block 74 having a T-shaped head 75, the spigots of which can be engaged with the rotor 60 by fitting the T-shaped head into the two semi-circular seatings 71 and swinging the neck or web 76 of the link into the transverse slot 69 of the rotor. The pin or rivet 77 connecting the terminal link 74 of the chain to the next link is made of a length greater than the width of the chain so that this pin protrudes to one side; the protruding end engages in a fork or open-ended slot 78 upon a rocker-plate 79 mounted against the inner face of one of the cheek-plates 61. The rocker-plate 79 is rotatably supported by the inwardly projecting end of one of the rotor bushes 72; a counter-plate 79a of the same thickness is fixed against the inner face of the other cheek-plate, being engaged by the inwardly projecting end of the bush and secured by the top spacer bolt 63. The rocker-plate 79 has a limited movement around the supporting bush, its upper edge being formed with a bay 80 for engaging a stop 81 provided on the top spacer 64; its fork or slot 78 is aligned upon the axis of the rotor, but according to its position in relation to the stop 81, a line joining the closed inner end of the fork to the circumferential seating 71 on the same side of the rotor will pass on one or other side of the rotor axis. In the extreme position shown in Fig. 5, the line is seen to pass on the right of the axis, so that any pull upon the link 74 would tend to turn the rotor in a counter-clockwise direction; if the plate 79 were rocked over to the other limit of its movement, the same line would pass to the left of the axis, so that any pull upon the link 74 would tend to turn the rotor in a clockwise direction. A leaf spring 82 fixed beneath the top spacer tends to hold the rocker-plate 79 in the extreme position first mentioned, but when the parachutes come into action the upward pull of the chain will cause the protruding end of the terminal link pin 77 engaged in the fork or slot 78 to throw the rocker-plate 79 to the opposite extreme position.

Below the rocker-plate, a quadrant arm 83 is mounted upon a pin 84 extending through the cheek-plates; the periphery 85 of the quadrant is adapted to engage the extremity of the extension arm 70 upon the rotor, thereby latching the rotor in its normal locking position. The quadrant is controlled by a timing device or delay action mechanism of any suitable kind which effects a gradual movement of the quadrant 83 so as to clear the extension arm 70 after a predetermined period; the movement is, however, normally prevented by a tooth 86 upon the rocker-plate, which engages with a tooth 87 upon the quadrant to resist the action of the timing device until the teeth have been disengaged by movement of the rocker-plate 79, following upon the deployment of the parachutes.

The timing device consists preferably of a spring-operated sliding rack 88 having a ratchet-pawl engagement with a train of gears 89 controlled by an escapement 90 to regulate the time of operation, the rack 88 being freely movable for setting the device but having its return movement delayed by operating the gear-train and escapement through the pawl and ratchet. The timing device is secured by one of the top spacer bolts 63 and by another bolt 91 at its lower end on the inside of one of the cheek-plates 61, so as to fit beneath the top spacer 64, between the rotor 60 and the fixed end of the chain; the sliding rack 88 has its outer end fitted with a compression spring 92 enclosed by telescopic tubes 93, the extremity of the inner movable tube being fitted with a knob or cap 94 from which a connection 95 is attached to a suitable point on the quadrant 83.

The rotor is controlled by a pair of coiled-leaf torsion springs 96 mounted around its end extensions outside the cheek-plates; each of these springs is enclosed by a narrow drum or housing 97 to which the outer turn 96a of the spring is secured by rivets or the like, the outer end of the drum being covered by a knurled cap or knob 98 having a central boss 99 which engages with the end extension 68 of the rotor and is secured thereto by a screw 100, so that both caps revolve with the rotor. The innermost turn 96b of each spring is hooked into a notch 101 on the boss of the respective cap 98, the two springs tending to revolve the rotor in a direction to press its extension arm 70 against the periphery 85 of the quadrant. The force exerted by the springs can be regulated by turning the drums 97 through a variable angle (up to 90 or 120 degrees for example) by means of loading levers 102 mounted between the inner ends of the drums and the respective cheek-plates. These levers may be stamped from sheet metal, with ears or flanges 103 to facilitate their manual operation and to limit their backward movement by abutting against the head or nut of the top spacer bolt 63; they are fitted with teeth 104 adjacent to the drums and they have a slotted engagement at 51 with the end extensions 68 of the rotor, allowing them to be pushed endwise so as to slide their teeth into any of a series of notches 105 on the drums. Thus the drums can be revolved through the desired angle to a terminal position of the levers where their ends are latched by spring catches 106 projecting in opposite directions through the cheek-plates; these catches may be mounted in a cylindrical bore 107 of the lower spacer 65, a single coiled spring 108 pushing the catches 106 outwards up to the limit set by a stop pin 109 on each catch. The outer faces of the catches are bevelled to provide a snap engagement with holes 110 in the loading levers 102 after the latter have overridden the bevelled ends, the catches then interlocking with the levers by means of undercut grooves 111 on their rear faces.

The cocking of the release-link is effected manually, without the aid of tools, by engaging the end-like spigots 75 in the notches 71 of the rotor while the latter occupies its free position, then bringing the protruding chain-link pin 77 over the slot 78 of the rocker-plate, and turning the rotor by means of its knurled caps or knobs 98 right back to clear the quadrant 83; this movement of the rotor carries the end-link 74 right into the rotor slot 69 and at the same time draws the protruding pin 77 down into the rocker-plate slot 78. While holding the rotor in this position, the delay unit 88 is compressed so that the quadrant 83 is forced upwards to engage the extension arm 70 and thus prevent return of the rotor 60. In its movement upwards, the quadrant 83 has passed over the lower part of the rocker-plate 79 and in so doing its tooth 87, machined to act as a cam, has pushed the rocker-plate 79 out of the way until movement of the quadrant 83 is completed, whereupon the rocker-plate tooth 86 is free to be returned by its spring to engage the quadrant cam-tooth 87 and hold the quadrant in this cocked position. Finally the loading levers 102 are engaged in the selected notches 105 of the spring drums or housings 97 and swung down to be locked by the spring catches 106; in this locked position of the levers, their ears or flanges 103 extend downwardly below the spring drums 97 so as to prevent the parachute lines from fouling under these drums, the ears being conveniently made of triangular shape, as seen in Fig. 4, to serve as deflectors for the lines.

The functioning of the release-link is as follows:

The pull of the opening parachutes forces the chain end-link 74 into a more vertical attitude so that the line of pull is over-center of the rotor axis, but preferably still within the limiting angle of friction of the rotor dead-center, so as to oppose the freeing torque of the rotor springs 96. In thus changing its attitude, the end-link 74 has pulled over the rocker-plate 79 by virtue of engagement of the protruding link-pin 77 in the slot 78 of the rocker-plate. The tooth 86 of the rocker-plate is thus forced out of engagement with the quadrant 83, which proceeds to be drawn out of the way of the rotor extension arm 70 by the pull of the delay unit. This operation is timed to cover the unsettled period during opening of the parachutes, when premature relief of load might occur, and during this period the quadrant 83 effectively prevents turning of the rotor by its springs to the release attitude. On the load alighting, the pull of the parachutes is relieved so that the rotor springs 96 take charge and are able to overcome the residual over-center pull on the rotor, which therefore turns to release the chain end-link 74 so that the parachutes can escape.

It will thus be seen that the improved release-link ensures orderly and separate release of the parachutes; thus in the case of a parachute-borne boat, no disastrous interference with launching is experienced, as with wind-filled and water-filled parachutes linked together in the close vicinity. The coil spring release force can be pre-adjusted to overcome the estimated pull of the parachutes under differing conditions of operation.

The period during which the device is locked against premature relief may be varied by fitting different-sized interference quadrants 83.

The timing device or delay unit, which is independent in action, may be of any suitable kind, the clockwork type mentioned being preferred; this device, in the case of a low altitude launching, will continue to effect release in its own set time after alighting.

The release-link may be employed for connecting one or more parachutes to any object or objects to be dropped from aircraft for safe delivery on land or sea, and the respective connections may be attached to either of the shackles or equivalent devices.

What I claim is:

1. A release-link comprising a cylindrical body, connections for applying load-tension to said body, a rotatable member mounted in said body and adapted to lock one of said connections in engagement with said body, the axis of rotation of said member intersecting the longitudinal axis of the link, said member including a seating for said one connection, and said seating being so located in relation to the axis of rotation of said member that the load-tension upon said one connection tends to maintain said member in locking position, spring means tending to rotate said member for unlocking said one connection, positive means for holding said member in locking position, and a timing device controlling the withdrawal of said positive holding means.

2. A release-link comprising a cylindrical body, connections for applying load-tension to said body, a rotatable member mounted in said body and adapted to lock one of said connections in engagement with said body, the axis of rotation of said member intersecting the longitudinal axis of the link, the load-tension upon said one connection in the locking position of said member preventing rotation of said member from the locking position, spring means tending to rotate said member for unlocking said one connection, positive means for holding said member in locking position, and a timing device controlling the withdrawal of said positive holding means.

3. A release-link comprising a body, connections for applying load-tension to said body, a T-shaped element upon one of said connections, a rotatable member mounted in said body, said member having a slot for engagement by said T-shaped element to lock said one connection in engagement with said body, the load-tension upon said one connection in the locking position of said member drawing said T-shaped element into said slot and tending to maintain said member in locking position, spring means tending to rotate said member for unlocking said one connection, positive means for holding said member in locking position, and a timing device controlling the withdrawal of said positive holding means.

4. A release-link comprising a body, connections for applying load-tension to said body, a T-shaped element upon one of said connections, a rotatable member mounted in said body, said member having a transverse slot to accommodate the shank of said element and an eccentric seating for the head of said element, a stop limiting rotation of said member in one direction, spring means tending to rotate said member in the reverse direction, the load-tension upon said one connection while said element is engaged in said slot and seating tending to maintain said member against said stop, positive means for holding said member against said stop, and a timing device controlling the withdrawal of said positive holding means.

5. In a release-link of the character described, a rotatable locking member adapted to engage one of the connections for the link, comprising a rotor journaled in the link, torsion springs engaged with said rotor, means for applying torsion to said springs, said rotor including a seating for said connection, the load tension upon said connection acting over-center of the rotational axis of said rotor to maintain said connection in said seating and to prevent rotation of said rotor in one direction, said torsion springs tending to turn said rotor in the opposite direction to release said link connection from said seating, positive means engaging said rotor to prevent rotation of said rotor in said opposite direction, and means for withdrawing said positive engaging means from said rotor at the expiration of a predetermined period from the application of the load-tension to said connections.

6. In a release-link of the character described, the combination of a link connection tensioned by the load and a rotatable locking member for said connection, said link connection including an element comprising a shank and a T-shaped head at one extremity of said shank, and said rotatable locking member consisting of a transversely slotted rotor having its ends journaled in the link, the transverse slot of said rotor being adapted to receive the shank of said element, a seating upon the periphery of said rotor, said seating being adapted to receive the T-shaped head of said element, the load-tension upon said connection normally maintaining said head in said seating and said shank in said slot, and torsion springs engaged with said rotor, said springs tending to turn said rotor in a direction to release said element when said load-tension is relieved.

7. A release-link comprising a body, connections for applying load-tension to said body, a rotatable member mounted in said body and adapted to lock one of said connections in engagement with said body, said member including a transverse slot and a peripheral seating to engage said one connection, torsion springs tending to rotate said member to a position for disengagement of said one connection, the load-tension upon said one connection normally maintaining it in engagement with said seating and preventing rotation of said member by said torsion springs until the load-tension is relieved, positive means for preventing rotation of said member by said torsion springs, and means for withdrawing said positive means at the expiration of a predetermined period from the application of load-tension to said connections.

8. A release-link comprising a body, connections for applying load-tension to said body, a rotatable member mounted in said body and adapted to lock one of said connections in engagement with said body, said member including a transverse slot and a peripheral seating to engage said one connection, torsion springs tending to rotate said member to a position for disengagement of said one connection, the load-tension upon said one connection normally maintaining it in engagement with said seating and preventing rotation of said member by said torsion springs until the load-tension is relieved, a locking member engaging said slot to prevent rotation of said member by said torsion springs, said locking member being adapted for withdrawal from said slot by load-tension upon said connections, and means for delaying the withdrawal of said locking member for a predetermined period after the application of load-tension to said connections.

9. A release-link comprising a body, connections for applying load-tension to said body, a rotatable member mounted in said body and adapted to lock one of said connections in engagement with said body, torsion springs tending to rotate said member to a position for disengagement of said one connection, the load-tension upon said one connection normally acting over-center of the rotational axis of said member to prevent its rotation by said springs, positive means engaging said member to prevent its rotation from normal locking position, and a timing device for withdrawing said positive means from said member after the application of load-tension to said connections.

10. A release-link comprising a body, connections for applying load-tension to said body, a rotatable member mounted in said body and adapted to lock one of said connections in engagement with said body, torsion springs tending to rotate said member to a position for disengagement of said one connection, the load tension upon said one connection normally acting over-center of the rotational axis of said member to prevent its rotation by said springs, said member having an arm extending outwards from its periphery, a quadrant rotatably mounted in said body, said quadrant including a peripheral surface substantially concentric with its rotational axis, said peripheral surface interfering with movement of said arm to prevent rotation of said member from normal locking position, and a timing device for rotating said quadrant to withdraw said peripheral surface from interference with said arm at the expiration of a predetermined period from the application of load-tension to said connections.

11. A release-link comprising a body, connections for applying load-tension to said body, a rotatable member mounted in said body and adapted to lock one of said connections in engagement with said body, torsion springs tending to rotate said member to a position for disengagement of said one connection, the load tension upon said one connection normally acting over-center of the rotational axis of said member to prevent its rotation by said springs, said member having an arm extending outwards from its periphery, a quadrant rotatably mounted in said body, said quadrant including a peripheral surface substantially concentric with its rotational axis, said peripheral surface interfering with movement of said arm to prevent rotation of said member from normal locking position, a rocker plate mounted in said body for limited rotational movement about the axis of said member, said one connection controlling the rocking movement of said plate, a timing device tending to rotate said quadrant for withdrawing said peripheral surface from interference with said arm, and interengaging teeth upon said quadrant and plate, said teeth being disengaged by rocking movement of said plate due to the application of load-tension to said connections for initiating the rotation of said quadrant by said timing device.

12. A release-link comprising a body, a lower connection and two upper connections for applying load-tension to said body, said lower connection including a swivel for relative rotation between said body and the load attached to said lower connection, said upper connections comprising the extremities of a chain adapted to be looped to a plurality of parachute lines, said chain having one extremity attached to said body and another extremity engageable with said body, a rotatable member mounted in said body and adapted to lock said other chain extremity in engagement with said body, the load-tension upon said other chain extremity in the locking position of said member preventing rotation of said member from the locking position, spring means tending to rotate said member for unlocking said other chain extremity, positive means for holding said member in locking position, and delayed-action means for the withdrawal of said positive holding means.

DANIEL WAUMSLEY COOPER.